United States Patent [19]

Nakamura

[11] 4,152,583
[45] May 1, 1979

[54] SYSTEM FOR READING OUT BAR CODED LABELS

[75] Inventor: Nobuhiro Nakamura, Amagasaki, Japan

[73] Assignee: Mitsubishi Denki Kabushiki Kaisha, Japan

[21] Appl. No.: 779,531

[22] Filed: Mar. 21, 1977

[30] Foreign Application Priority Data

Mar. 31, 1976 [JP] Japan .................................. 51-35720

[51] Int. Cl.² ...................... G06K 7/14; A23G 9/00; G08B 5/00
[52] U.S. Cl. .................................. 235/462; 235/454; 250/203 CT; 340/366 CA
[58] Field of Search ................ 235/61.11 E, 454, 462, 235/463; 250/203 CT, 568, 569, 566; 340/366 CA

[56] References Cited

U.S. PATENT DOCUMENTS

| 3,600,556 | 8/1971 | Acker | 235/61.11 E |
| 3,774,014 | 11/1973 | Berler | 235/61.11 E |
| 3,801,775 | 4/1974 | Acker | 235/61.11 E |
| 3,886,328 | 5/1975 | Harms, Jr. et al. | 235/61.11 E |
| 3,902,047 | 8/1975 | Tyler et al. | 235/61.11 E |

*Primary Examiner*—Daryl W. Cook
*Attorney, Agent, or Firm*—Robert E. Burns; Emmanuel J. Lobato; Bruce L. Adams

[57] ABSTRACT

Bar coded labels are picked up by television camera disposed in n register units respectively. The resulting video signals are written into allotted portions of a writing and reading device through a first multiplexer under the control of a control device. The written video signals are read out from the device controlled by the control device while a scanning direction changes. Then the read signal are successively converted to digital signals which are, in turn, examined if they are regular coded signals. The regular coded signals are delivered to the resistor units through a second multiplexer controlled by the control device.

8 Claims, 4 Drawing Figures

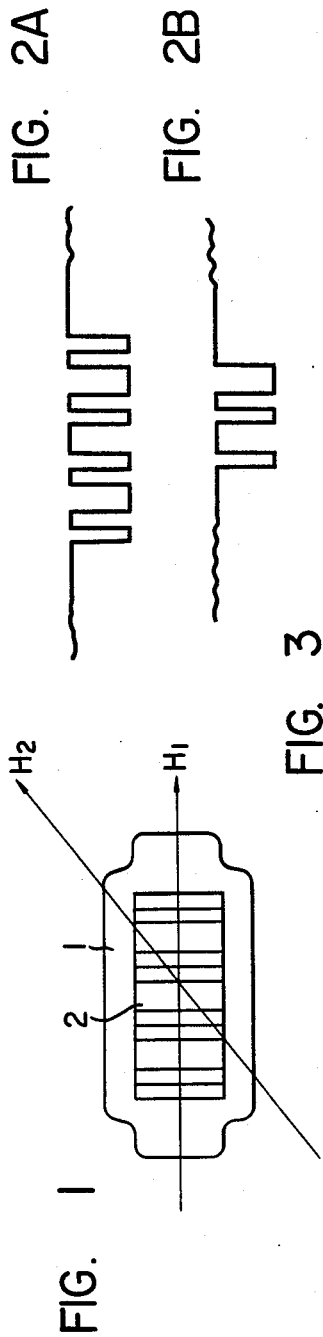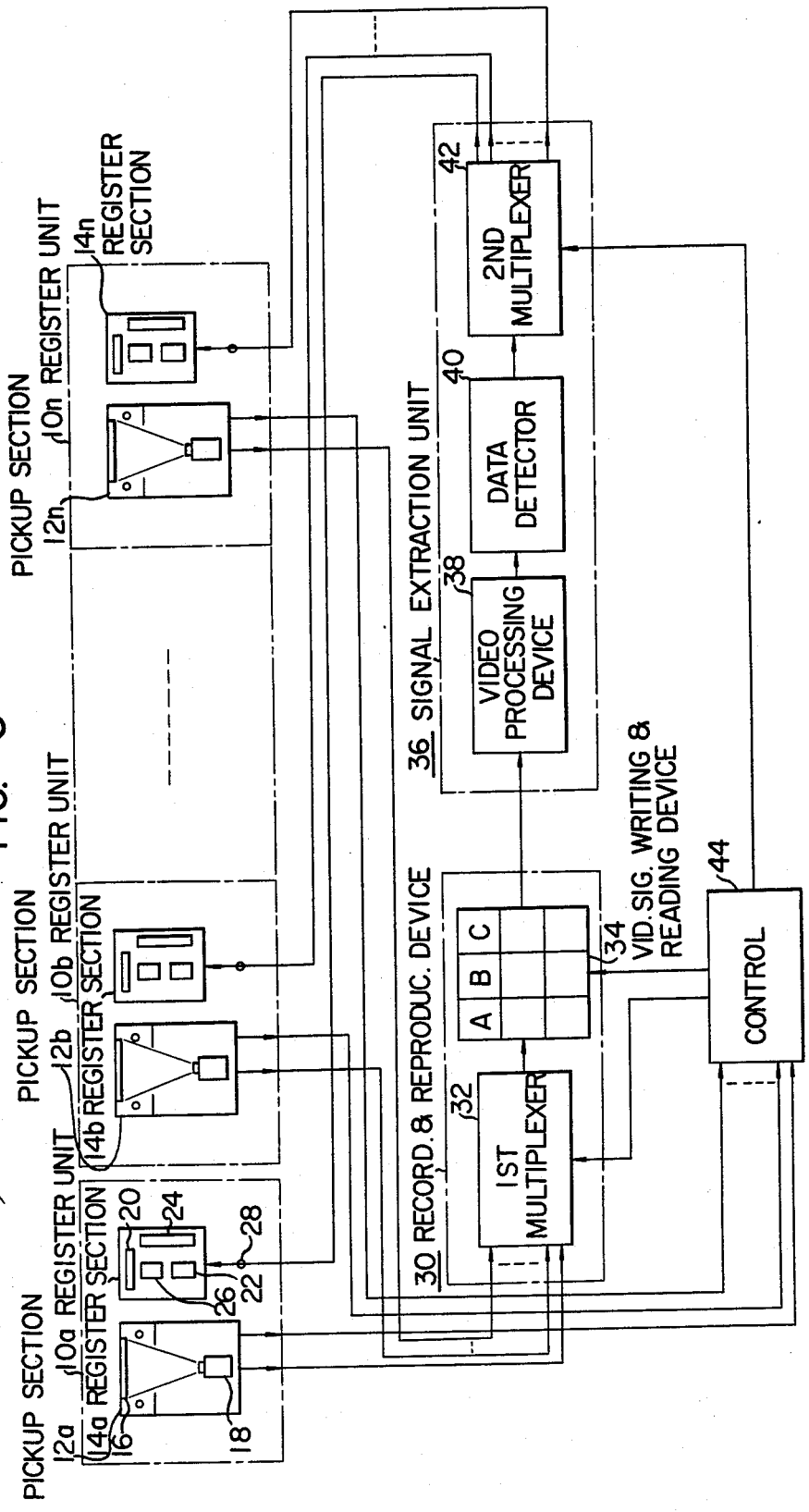

SYSTEM FOR READING OUT BAR CODED LABELS

BACKGROUND OF THE INVENTION

This invention relates to a system for reading out bar coded labels employed with point-of-sales (which is abbreviated to P.O.S.) systems and the like.

In order to read out the array of bar coded labels affixed to goods to indicate the type, price etc. thereof, it has been already proposed to place an item of goods having bar coded labels affixed thereto on a marchandise pedestal, pick up an associated bar coded label by a television camera through a transparent window provided on the pedestal, and process the resulting video signal thereby to read out a signal expressed by an array of bar codes printed on the picked-up label. Also in order to correctly read out the bar coded labels by the television camera, scanning lines produced in the television camera are required to coincide in direction with an array of bar codes on each label. To this end, a raster formed on the television camera of the scanning lines produced therein has been rotated at a predetermined speed while an associated bar coded label is picked up by the television camera. When it has been determined that a corresponding video signal from the television camera is of a predetermined code configuration by processing the signal, the bar coded label is read out from that video signal on the presumption that the scanning lines coincide in direction with the array of the bar codes on the label. However the rotation of the raster on the television camera has led to the necessity of making the television camera with a complicated construction. Also where a multiplicity of such television cameras are used in a single store such as in a supermarket, it has been required to rotate a raster formed on each of the television cameras and process the resulting video signal from each camera. Therefore there has arisen a problem that equipment in its entirety become expensive.

Accordingly it is an object of the present invention to provide a new and improved system for reading out the array of bar codes printed on bar coded labels affixed to goods by using a television camera having a simple construction.

It is another object of the present invention to provide a new and improved system for reading out bar coded labels affixed to goods with a simple construction by operatively associating a single video signal writing and reading device with a plurality of television cameras.

SUMMARY OF THE INVENTION

The present invention provides a system for reading out bar coded labels, comprising at least one television camera means for picking up a bar coded label affixed to items or goods to produce a video signal indicating an array of bar codes printed on the bar coded label, a single video signal writing and reading unit including means for writing the video signal from the television camera means therein as a spatial video pattern and for scanning the written video pattern while changing a scanning direction thereby to read out, as an electrical signal, the video pattern therefrom, and a signal extraction unit including means for processing the electrical signal read out from the video signal writing and reading unit to extract the array of bar codes on the picked up label.

In a preferred embodiment of the present invention the system from reading out bar coded labels may comprise a plurality of register units, each including pick up section having a television camera disposed therein to successively pick up bar coded labels affixed to goods, and a register section for effecting receipts and payments of cash. A single writing and reproducing unit operatively coupled to all the plurality of register units includes a first multiplexer and video signal writing and reading unit, the first multiplexer switching the video signals from the respective television cameras in a predetermined order to deliver the switched video signals to the video signal writing and reading unit. The video signal writing and reading means including a plain writing means for writing the video signals entered into the plain writing means thereof in the same pattern as the intact video signals picked up by the associated television cameras and means for reading out the written video signals from the plain written portion one at a time while changing a scanning direction. A signal extraction unit includes video processing means for converting the video signal read out from the video signal writing and reading unit a digital signal, data detector means for determing whether or not the digital signal is a regular coded signal, and a second multiplexer for delivering the regular coded signal from the data detector means to the register section disposed in an associated one of the register units. Control means is provided for controlling the switching operation of the first multiplexer, the writing and reading of the video signal writing and reading unit and the switching operation of the second multiplexer.

BRIEF DESCRIPTION OF THE DRAWING

The present invention will become more readily apparent from the following detailed description taken in conjunction with the accompanying drawing in which:

FIG. 1 is a plan view of a bar coded label illustrating directions in which a television camera involved scans the label;

FIG. 2A and 2B are diagrams illustrating video signals produced by scanning the bar coded label of FIG. 1 in the directions shown in FIG. 1 by the television camera; and FIG. 3 is a block diagram of a system for reading out bar coded labels constructed in accordance with the principles of the present invention.

DESCRIPTION OF THE PREFERRED EMBODIMENT

Bar coded labels such as shown by the reference numeral 1 in FIG. 1 are generally affixed to goods and include the array of bar codes 2 printed thereon to extend more or less widthwise of the label indicating the type, price etc. of an associated one of the goods. The array of bar codes 2 is usually picked up by a television camera involved (not shown) to be read out. In order to correctly read out the bar coded labels, scanning lines produced in the television camera are required to be properly located with respect to an array of bar codes on each label. That is, the scanning lines are required to coincide in direction with the array of bar codes. For example, if the scanning lines run along the longitudinal line labelled $H_1$ of the label 1, that is to say, if the scanning lines coincide in direction with the array of bar codes 2 then the television camera can produce a video signal having a correct waveform as shown in FIG. 2A. However if the scanning lines run along a line $H_2$ oblique to the longitudinal line $H_1$ as shown in FIG. 1, then the resulting video signal has a waveform such as shown in FIG. 2B. That is, the signal does not include signal portions representing a leading and a tailing code respectively. Thus the label can not be correctly read out.

In order to prevent a video signal from the television camera from having a waveform such as shown in FIG. 2B, it has been already proposed to rotate a raster formed on the television camera of scanning lines produced therein. This measure has not only make the television camera into a complicated construction but also, when a multiplicity of such television cameras are used in a single store, the equipment in its entirety has been expensive as above described.

In order to eliminate the disadvantages of the prior art practice as above described, the present invention provides a system for reading out bar coded labels comprising at least one television camera for picking up bar coded labels with a scanning direction thereof remaining unchanged, and a unit for writing and reading a video signal from the television camera. The writing and reading out unit is operative to read out the written video signal while a scanning direction is changing. Then a signal extraction unit processes the read video signal in a predetermined order to sense a signal represented by an array of bar codes on the label.

FIG. 3 shows a system for reading out bar coded labels constructed in accordance with the principles of the present invention. The arrangement illustrated comprises a plurality, in this case, n of register units 10a, 10b, . . . 10n. Each of the register units 10a, 10b, . . . 10n includes a pick up section 12 and a register section 14 each suffixed with the same reference character as that identifying the mating register unit. For example, the pick up section 12a is disposed in the register unit 10a and the register section 14b is disposed in the register unit 10b. Each pick up section 12 is provided with a merchandise pedestal 16 on which goods with bar coded labels (not shown) are adapted to be successively placed and with a television camera 18 disposed below the pedestal 16 to pick up bar coded labels affixed to goods placed on the pedestal 16 one at a time. Each register section 14 includes register (not shown) also performing calculations, a display device 20 for displaying summations and the like during the accurate account operation, a typewiter 22 for typewriting characters and figures, a drawer 24 for receipt and payments, a keyboard 26 for manually entering their required data into the register, and a control terminal 28 through which electrical signals can externally enter the register.

All the pick up sections 12a, 12b . . . 12n are connected to a single writing or recording and reproducing unit generally designated by the reference numeral 30. The writing and reproducing unit 30 includes a first multiplexer 32 connected to outputs of all the television cameras 18 to switch video signals therefrom in order to write the video signals one at a time, and a video signal writing and reading device 34 connected to the multiplexer 32. The writing and reading device 34 is formed, for example of a scan converter and includes a plain writing portion divided into a plurality of writing areas located in predetermined positions A, B, C, . . . The video signal from each television camera passes through the first multiplexer 32 to be written in into that writing area located at an allotted one of the predetermined positions and in the same pattern as the intact video signal produced by the associated television camera. The writing and reproducing unit 34 is further operative to read out the written video signals while a raster involved is changed in scanning direction.

The video signal read out from the writing and reading device 34 is supplied to a data extraction unit generally designated by the reference numeral 36. The data extraction unit device 36 includes a video processing device 38 connected to the writing and reading device 34 to process the video signal therefrom to deliver a signal in the digital form corresponding to an array of bar codes printed on that bar coded label picked up by the associated television camera to a data detector 40. The data detector 40 examines the digital signal from the video processing device 38 to detect if the examined video signal forms a regular coded signal as will be described hereinafter. The regular video signal as detected by the data detector 40 is applied to a second multiplexer 42, which is, in turn, operative to switch the predetermined video signals to separately supply them to the register sections 14a, 14b, . . . 14n allotted therefor.

As shown in FIG. 3, a control device generally designated by the reference numerals 44 is connected at the input to separate outputs of all the pick up sections 12a, 12b, . . . 12n and at the outputs to the first and second multiplexers 32 and 42 respectively and the writing and reading device 34. Thus the control device 44 is operative to control time points at which the first multiplexer 32 switches the video signals delivered thereto from the individual television cameras to introduce them into the allotted portions of the writing and reading device 34 and to correspondingly specify writing and reading positions on the writing and reading out device 34. The control device 44 further serves to control the second multiplexer 42 to deliver the coded signals from the data detector 40 to the associated register sections 14a, 14b, . . . 14n respectively.

The arrangement of FIG. 3 is operated as follows: Bar coded labels affixed to those goods placed on the merchandise pedestals 16 located in the respective register units 10a, 10b, . . . 10n are successively picked up by the television cameras 18 and the resulting video signals are entered into the first multiplexer 32. In this case, it is to be noted that each television camera includes its raster having a predetermined fixed direction as in a usual television cameras.

The video signals from the plurality of the pick up sections 12a, 12b, . . . 12n are switched by the first multiplexer 32 so that the video signals from the television cameras are introduced into the allotted writing portions of the video signal writing and reading device 34 under the control of the control device 44.

In order to switch and select the video signals from the television cameras, the n pedestals 16 can be successively scanned by the mating television cameras in a predetermined order. This measure is advantageous in that the resulting construction is simplified and the control is also simple. Alternatively, a sensor switch (not shown) may be provided on each pickup section to sense each of those merchandise pedestals 16 on which goods have been placed. Then the sensed signals from the sensor switches are applied to the first multiplexer 32 to give a "write command" the latter. Then only the video signals from the pickup sections from which the "write commands" originate are switched to be introduced into the appropriate portions on the writing and reading device 34. The latter measure is advantageous in that the processing time becomes short because, with a multiplity of pickup sections disposed, only those pedestals 16 having goods placed thereon are processed.

The video signals thus passed through the first multiplexer 32 are written in on the writing and reading device 34 at the predetermined positions A, B, C, ... corresponding to those pickup sections from which the video signals have been issued respectively.

The video signals thus written are read out in a nondestructive manner from each of the writing positions while the scanning direction is changed. After the video signal has been completely read out from an associated one of the writing positions, the content written in that writing position is erased in readiness for the next succeeding writing and reading.

The writing and reading device 34 may have the writing positions predetermined by the respective pickup sections. By this measure the writing and reading positions can be simply controlled because the writing positions are preliminarily determined by the respective pickup sections 10. Alternatively all the pickup sections may possess the entire writing positions in common. Each time "write command" has been given, an associated video signal is written in a vacant writing position. The latter measure is advantageous in that it is sufficient that the resulting writing device be small-sized. This is because the number of the writing areas is smaller than that of the pickup sections.

In this way an array of bar codes on a bar coded label has been scanned for reading out and written in the writing and reading device 34 under the control of the control device 44. In this case, if the scanning lines coincide in direction with the array of bar codes thus written as shown at the line H₁ in FIG. 1 then a video signal is produced corresponding to the array of bar codes as shown in FIG. 2A. The video processing device 38 converts this video signal to logic voltages so that that portion of the signal higher with a predetermined level as the center is of a voltage of logic ONE and that portion thereof less with the same center is a voltage of binary ZERO. Then the data detector 40 examines the configuration of the logic signal to determine if the examined signal is a regular signal having the correct code configuration. The regular signal as determined by the data detector 40 is delivered to the register section 14 disposed in an associated one of the register units 10a, 10b, ... 10n through the second multiplexer 42 under the control of the control device 44.

When the signal from the second multiplexer 42 is received, the register section actuates the register (not shown), the display device 20 and the typewriter 22 disposed therein to display the required data such as a price of an article of commerce indicated by the array of bar codes and perform the addition operation as determined.

From the foregoing it is seen that video signals from bar coded labels picked up by the n pickup sections are successively processed by a single set of the writing and reading unit and the signal extraction unit after which the processed signals are delivered to the associated register sections, respectively thereby to perform their own summation operations.

While the present invention has been illustrated and described in conjunction with a single preferred embodiment thereof it is to be understood that numerous changes and modifications may be resorted to without departing from the spirit and scope of the present invention. For example, the present invention has been described in conjunction with a single writing and reproducing unit and a single signal extraction unit used to process video signals from a plurality of television cameras but the same may be used to construct reading systems including a portable pickup section to read out bar coded labels through the utilization of the fact that the television camera can be constructed to be small-sized and simple as compared with those having the rotating raster. This is because the present invention simplifies the scanning by the television camera. In the latter case, the present invention is particularly suitable for handling heavy goods because such goods are not required to be intentionally placed on the merchandise pedestals.

What is claimed is:

1. A system for reading out bar coded labels, comprising: at least one television camera means for picking up a bar coded label affixed to an item for producing a video signal indicating an array of bar codes printed on the bar coded label; a single video signal writing and reading unit including means for writing said video signal from said television camera means therein as a spatial video pattern and for scanning said written video pattern while changing a scanning direction of said written video pattern thereby to read out as an electrical signal said video pattern therefrom; and a signal extraction unit including means for processing said electrical signal read out from said video signal writing and reading unit to extract said array of bar codes on said label.

2. A system for reading out bar coded labels as claimed in claim 1 wherein said video signal writing and reading unit includes a scan converter.

3. A system for reading out bar coded labels as claimed in claim 1 wherein said means for processing of the signal extraction unit comprises video processing means for converting said video signal read out from said video signal writing and reading unit to a digital signal, and data detector means for determining whether or not said digital signal is a regular coded signal.

4. A system for reading out bar coded labels, comprising: a plurality of register units, each unit including a pickup section having a television camera to pick up bar coded labels affixed to goods, and a register section for effecting receipts and payments of cash; a single writing and reproducing unit operatively coupled to all of said plurality of register units and including a first multiplexer and a video signal writing and reading unit, said first multiplexer switching said video signals from said respective television cameras in a predetermined order to deliver said switched video signals to said video signal writing and reading unit, said video signal writing and reading unit including a plain writing means for writing said video signals entered thereinto into said plain writing means in the same pattern as the intact video signals picked up by the associated television cameras, and means for reading out said written video signals from said plain writing portion one at a time while charging a scanning direction of said written video signals; a signal extraction unit including video processing means for converting said video signal read out from said video signal writing and reading unit to a digital signal, data detector means for determining whether or not said digital signal is a regular coded signal, and a second multiplexer for delivering said regular coded signals from said data detector means to said register section disposed in an associated one of said register units; and control means for controlling the switching operation of said first multiplexer, the writing and reading of said video signal writing and reading unit and the switching operation of said second multiplexer.

5. A system for reading out bar coded labels as claimed in claim 4 wherein each of said pickup sections includes a merchandise pedestal, and said television camera included in each of said pickup section is positioned for picking up a bar coded label affixed to the goods placed on said merchandise pedestal.

6. A system for reading out bar coded labels as claimed in claim 4 wherein said first multiplexer successively switches said video signals from said television cameras disposed in said plurality of register units to successively deliver said video signals to said video signal writing and reading unit.

7. A system for reading out bar coded labels as claimed in claim 5 wherein said first multiplexer switches only said video signals from said television cameras disposed in the pickup sections having goods placed on said merchandise pedestals to deliver the switched video signals to said video signal writing and reading unit.

8. A system for reading out bar coded labels as claimed in claim 4 wherein said video signal writing and reading unit includes a scan converter.

* * * * *